United States Patent [19]

Lightner

[11] Patent Number: 5,224,549

[45] Date of Patent: Jul. 6, 1993

[54] SHOE FOR HORSES

[76] Inventor: Amy Lightner, 4033 Sherman Way, Sacramento, Calif. 95817

[21] Appl. No.: 915,519

[22] Filed: Jul. 20, 1992

[51] Int. Cl.⁵ .................................................. A01L 3/00
[52] U.S. Cl. ........................................... 168/18; 54/82
[58] Field of Search ................... 168/1, 18, 22; 54/82

[56] References Cited

U.S. PATENT DOCUMENTS

| 1,298,364 | 3/1919 | McCoy | 168/18 |
| 3,703,209 | 11/1972 | Glass | 168/18 |
| 3,732,929 | 5/1973 | Glass | 168/18 |
| 4,290,487 | 9/1981 | Unger | 168/18 |
| 4,548,026 | 10/1985 | Shidner | 54/82 |
| 5,148,657 | 9/1992 | Stafford et al. | 168/18 X |

FOREIGN PATENT DOCUMENTS

| 358712 | 3/1906 | France | 168/18 |
| 683409 | 6/1930 | France | 168/18 |
| 240385 | 10/1925 | United Kingdom | 54/82 |

Primary Examiner—Robert P. Swiatek
Attorney, Agent, or Firm—Thomas R. Lampe

[57] ABSTRACT

A boot-type shoe for horses including a relatively rigid sole member, a flexible sleeve affixed to the sole member and extending upwardly therefrom, and an arrangement for securing the sleeve in engagement with a horse's leg to retain the shoe on the horse.

7 Claims, 3 Drawing Sheets

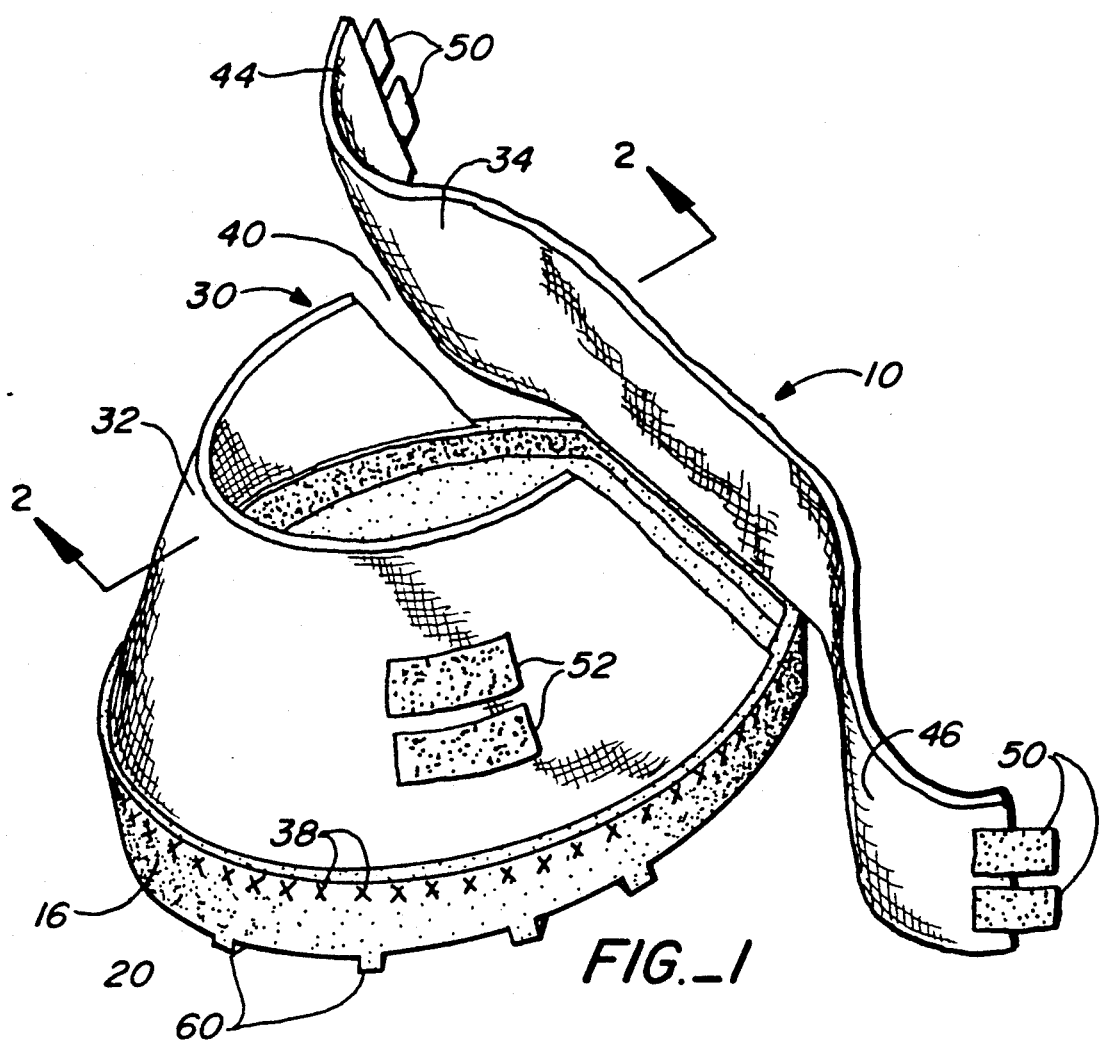
FIG._1
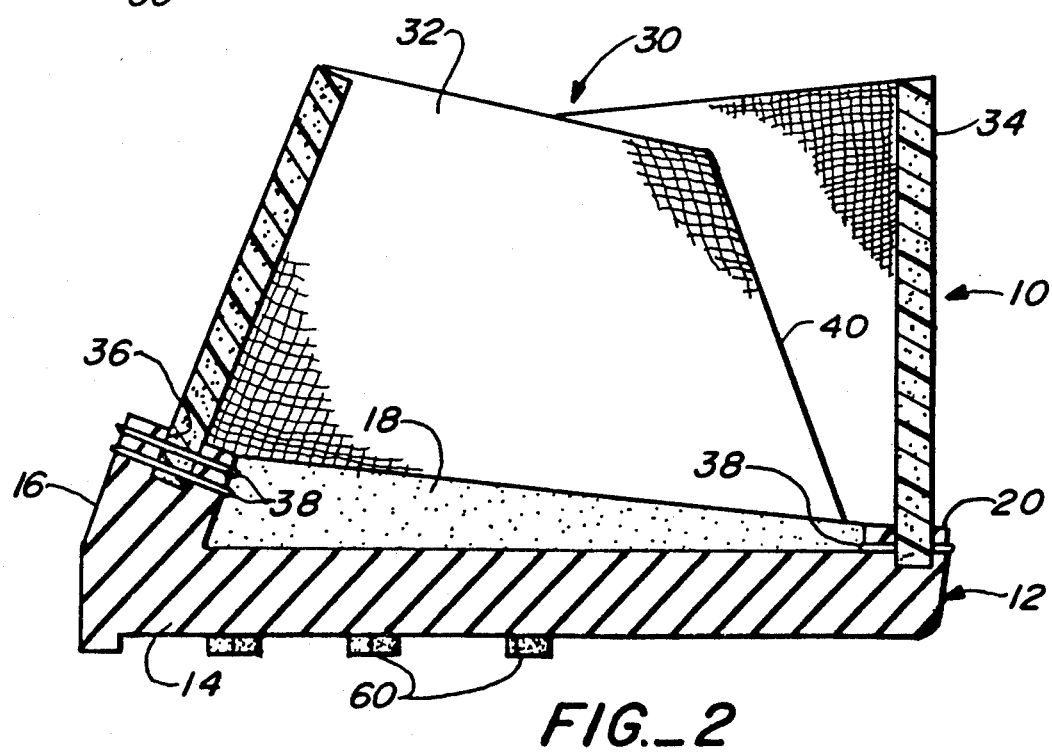
FIG._2

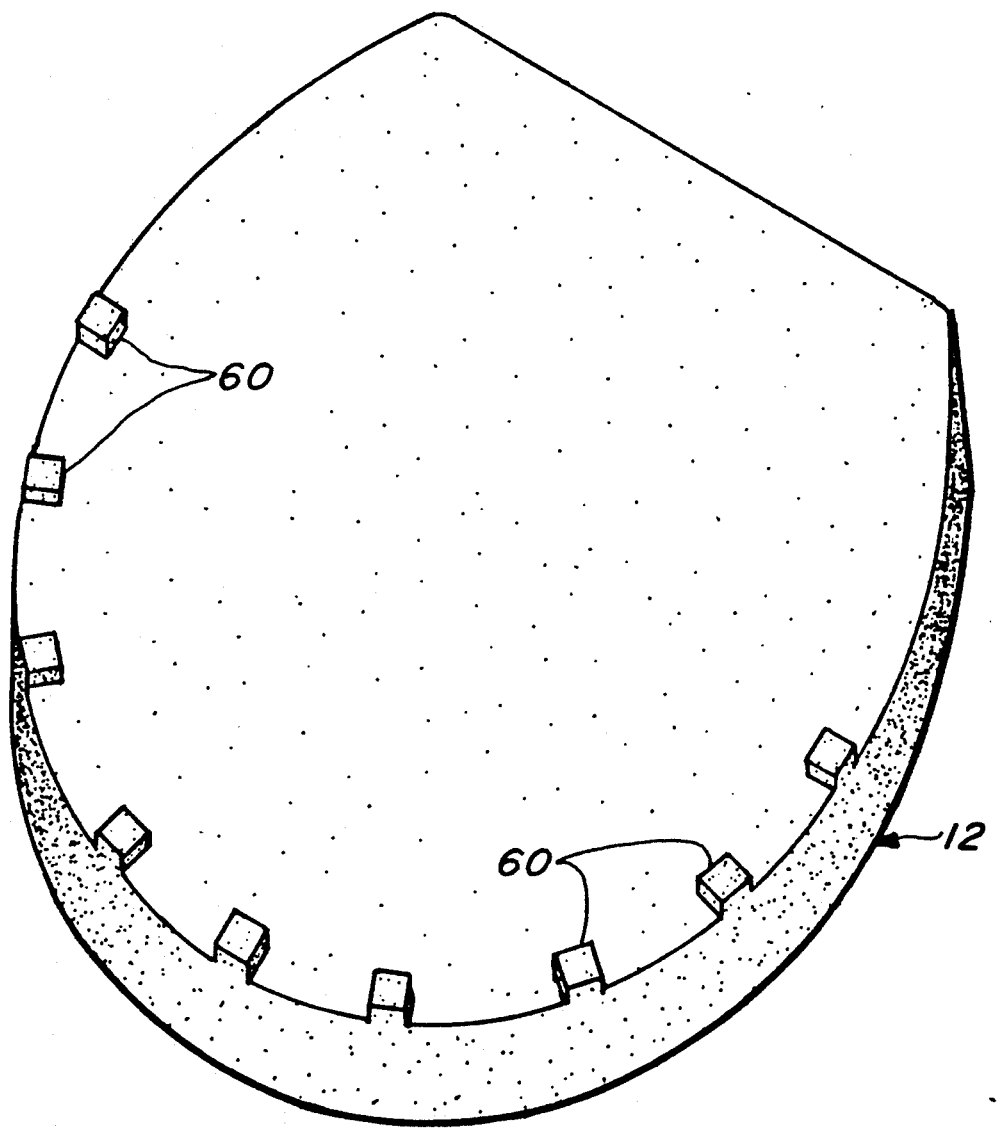
FIG._3

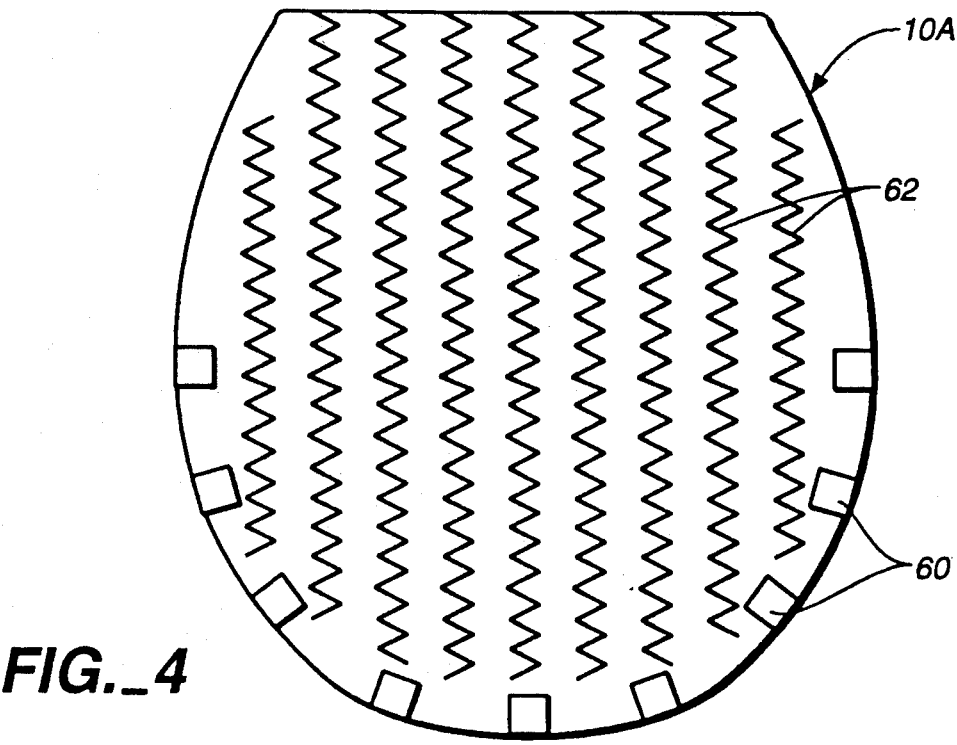
FIG._4
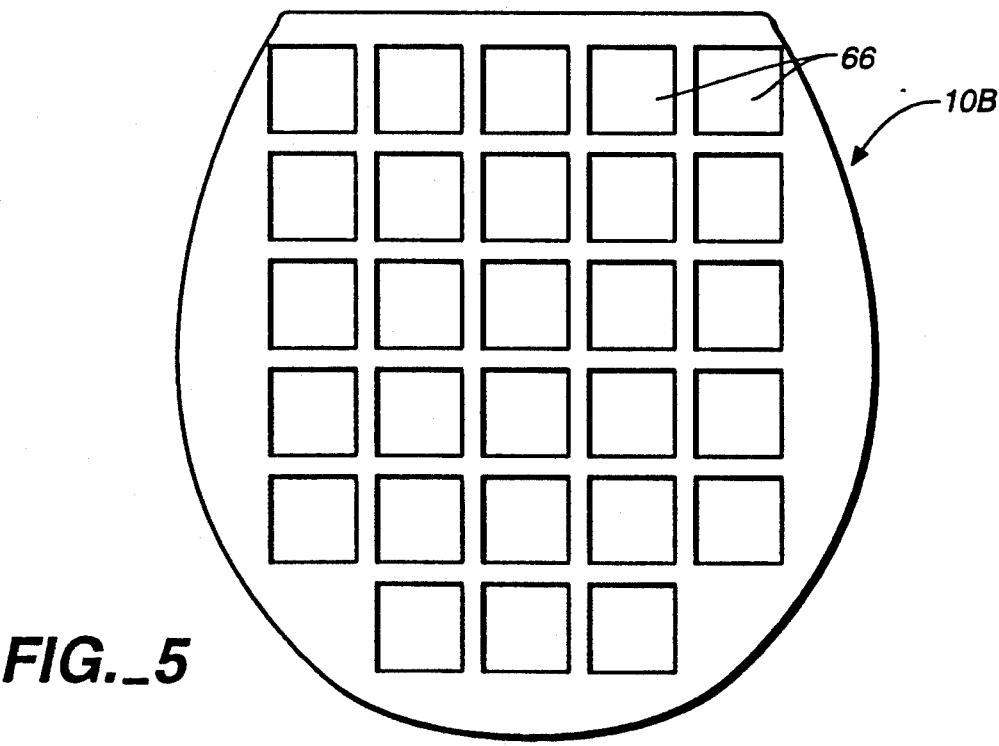
FIG._5

SHOE FOR HORSES

TECHNICAL FIELD

This invention relates to a shoe construction for horses. More particularly, the invention pertains to a boot-type horse shoe which is readily selectively attachable to a horse's hoof or detachable therefrom.

BACKGROUND ART

U.S. Pat. No. 3,703,209, issued Nov. 21, 1972, and U.S. Pat. No. 3,732,929, issued May 15, 1973, disclose molded boot-type horse shoes. The shoes disclosed in these patents are for the purpose of at least temporarily replacing conventional nail-anchored shoes. The shoes are characterized by their employment of a unitary, molded construction including a relatively stiff sole portion and integral upstanding walls of a shape generally conforming to a horse's foot. Urethane is suggested as a suitable plastic composition for construction of such horse boots.

Prior art horse boot constructions have a number of drawbacks. For example, it is often difficult to obtain a correct fit with horse boots of unitary molded construction. Horses have a tendency to throw off such boots. Furthermore, relatively inflexible boot constructions of the type known in the prior art can injure or damage soft tissue of the animal due to rubbing. Also, of course, leg movement can be impeded. Another deficiency in prior art approaches resides in their use of rather complex and relatively expensive connectors to attach and detach the boot relative to the horse.

DISCLOSURE OF INVENTION

The present invention relates to a horse shoe construction of the boot type which is relatively simple and inexpensive in construction. The shoe may selectively readily be attached to a horse or detached therefrom. The construction of the shoe is such that it does not impede movement of the horse. It also greatly reduces the possibility of injury to the animal's soft tissue.

The horse shoe of the present invention includes a sole member having a sole member bottom and a sole member wall extending upwardly from the sole member bottom and defining an interior for receiving a horse hoof. The sole member bottom and the sole member wall are of integral, relatively rigid construction, the sole member wall generally conforming to and encompassing the outer surface of a horse hoof positioned in the sole member. The sole member wall has an upper end terminating at a location below the coronary band.

Sleeve means is affixed to the sole member wall and extends upwardly therefrom. The sleeve means is engageable with a portion of a horse's leg above the coronary band and adjacent to the hoof. The sleeve means is formed of flexible sheet material whereby flexure of the horse's leg above the hoof is unimpeded by the sleeve.

Securement means is provided for securing the sleeve means in engagement with the sole member to retain the shoe on the horse.

The sleeve means comprises a first sleeve element affixed to and extending upwardly from the front and sides of the sole member. In addition, a second sleeve element is affixed to an extends upwardly from the rear of the sole element. The first and second sleeve elements are in partially overlapping relationship when the shoe is retained on the horse.

The second sleeve element is elongated and has two end portions having distal ends spaced from one another and from the location of securement of the second sleeve element to the rear of the sole member. The end portions are at least partially wrapped about and engage the first sleeve element when the shoe is retained on the horse. The securement means comprises synthetic clasp material disposed on the end portions adjacent to the distal ends thereof and synthetic clasp material on the first sleeve element engageable with the synthetic clasp material on the end portions when the end portions are at least partially wrapped about and engage the first sleeve element.

Other features, advantages, and objects of the present invention will become apparent with reference to the following description and accompanying drawings.

BRIEF DESCRIPTION OF DRAWINGS

FIG. 1 is a perspective view of a horse shoe constructed in accordance with the teachings of the present invention;

FIG. 2 is an enlarged, cross-sectional view taken along the line 2—2 of FIG. 1;

FIG. 3 is a bottom, perspective view of the sole member employed in the construction of the horse shoe;

FIG. 4 is a bottom, plan view of an alternative embodiment of a sole member bottom; and FIG. 5 is a bottom, plan view of yet another alternative sole member bottom.

BEST MODE FOR CARRYING OUT THE INVENTION

Referring now to FIGS. 1-3, a horse shoe constructed in accordance with the teachings of the present invention is generally designated by reference numeral 10. The shoe includes a sole member 12 which is of relatively rigid construction, being preferably formed of molded plastic material such as urethane.

Sole member 12 includes a sole member bottom 14 and a sole member wall 16 integrally formed therewith. Sole member bottom 14 and sole member wall 16 define an interior 18 for receiving a horse hoof (not shown). The sole member wall 16 extends about the periphery of the sole member bottom and is of a shape generally conforming to and encompassing the outer surface of a horse hoof positioned in the sole member. The upper end 20 of the sole member wall terminates at a location below the coronary band of the horse.

A sleeve 30 is affixed to the sole member wall 16 and extends upwardly therefrom. The sleeve is engageable with a portion of a horse's leg above the coronary band and adjacent to the hoof. The sleeve is formed of flexible sheet material whereby flexure of the horse's leg above the hoof is unimpeded by the sleeve. Furthermore, such material is preferably resilient and stretchable so that it readily conforms to the leg of a horse. A material which has been found to be particularly useful in construction of the sleeve is closed cell, foamed neoprene of the type commonly utilized in the construction of diver wetsuits. If desired, the material may be a laminate of the closed cell, foamed neoprene and one or more outer layers of stretchable fabric.

Sleeve 30 includes a first sleeve element 32 affixed to and extending upwardly from the front and sides of sole member 12. The sleeve 30 also includes a second sleeve element 34 affixed to and extending upwardly from the rear of the sole member.

It is to be noted that a slot 36 is formed at the upper end 20 of sole member wall 16. The sleeve elements 32, 34 are positioned in the slot 36 and secured therein. In the arrangement illustrated, stitching 38 is employed for such purpose. Alternatively, or in conjunction with the stitching, a suitable adhesive may be utilized to serve such purpose.

First sleeve element 32 is a generally wall-like element tapered inwardly from the sole member as the generally wall-like element progresses upwardly from the sole member. First sleeve element 32 defines a rearwardly disposed opening 40 for facilitating ingress and egress of a horse's foot relative to the horse shoe. Opening 40 faces second sleeve element 34 and is spaced from the location of securement of the second sleeve element to the rear of the sole member 12. It will be appreciated that second sleeve element 34 may readily be bent at the location of its securement to the sole member to facilitate positioning of a horse's foot into the confines of the sole member and first sleeve element 32.

Second sleeve element 34 is elongated and has two end portions 44, 46 having distal ends spaced from one another and also spaced from the location of securement of the second sleeve element to the rear of the sole member. The end portions are for positioning in engagement and partially overlapping relationship with first sleeve element 32.

Securement means is provided to maintain the sleeve elements in engagement as just described. More particularly, the securement means includes synthetic clasp material strips 50 affixed to the end portions 44, 46. An example of such material is synthetic clasp material sold under the trademark Velcro. Strips 50 are brought into engagement with strips 52 of synthetic clasp material on the sides of first sleeve element 32. This serves to tightly bind the lower end of the horse's leg within the confines of sleeve elements 32, 34. Preferably, the positioning of the strips of synthetic clasp material 50, 52 is such that second sleeve element 32 will be stretched to some degree when fastened in position relative to first sleeve element 32. This ensures conformance to the horse's leg at all times to provide for positive securement of the horse shoe to the horse. Of course, the capacity of the sleeve elements for even greater stretch will allow the horse's leg to freely flex so that movement thereof is unimpeded. The material employed in the construction of sleeve elements 32, 34 will not wear on the leg and damage the soft tissue of the animal as might very well be the case when unitary, molded, boot-like horse shoes are employed.

In the FIGS. 1-3 embodiment of the invention, the ground engaging surface of the horse shoe sole member bottom is relative planar and has a plurality of cleats 60 projecting downwardly therefrom closely adjacent to the outer periphery of the sole member. In the FIG. 4 embodiment, the shoe 10A includes not only the cleats 60 but also spaced, sawtooth-shaped slits 62 to reduce the chance of slippage. Embodiment 10A is otherwise identical to shoe 10 disclosed in FIGS. 1-3. In FIG. 5, a shoe 10B with a waffle-type tread 66 is shown.

I claim:

1. A shoe for horses, said horse shoe comprising, in combination:

a sole member including a sole member bottom and a sole member wall extending upwardly from said sole member bottom and defining an interior for receiving a horse hoof, said sole member bottom and said sole member wall being of integral, relatively rigid construction, said sole member wall generally conforming to and encompassing the outer surface of a horse hoof positioned in said sole member and having an upper end terminating at a location below the coronary band;

sleeve means affixed to said sole member wall an extending upwardly therefrom, said sleeve means engageable with a portion of a horse's leg above the coronary band and adjacent said hoof and formed of flexible sheet material whereby flexure of the horse's leg above the hoof is unimpeded by said sleeve; and securement means for securing said sleeve means in engagement with said leg portion to retain said shoe on said horse, said sleeve means comprising a first sleeve element affixed to and extending upwardly from the front and sides of said sole member and a second sleeve element affixed to and extending upwardly from the rear of said sole member, said first and second sleeve elements being in partially overlapping relationship when said shoe is retained on said horse, said second sleeve element being elongated and having two end portion s with distal ends spaced from each other and from the location of securement of said second sleeve element to the rear of said sole member, said end portions being at least partially wrapped about and engaging said first sleeve element when said shoe is retained on said horse.

2. The horse shoe according to claim 1 wherein said securement means comprises synthetic clasp material disposed on said end portions adjacent to the distal ends thereof and synthetic clasp material on said first sleeve element engageable with the synthetic clasp material on said end portions when said end portions are at least partially wrapped about and engage said first sleeve element.

3. The horse shoe according to claim 1 wherein said material is resilient, stretchable material readily conformable to the leg of the horse.

4. The horse shoe according to claim 3 wherein said material is at least partially comprised of closed cell neoprene.

5. The horse shoe according to claim 1 wherein said sole member wall defines a slot at the upper end thereof, said sleeve means positioned in said slot and fastened therein by stitching.

6. The horse shoe according to claim 1 wherein a plurality of spaced cleat members project downwardly from the sole member bottom closely adjacent to the outer periphery of said sole member.

7. The horse shoe according to claim 1 wherein said first sleeve element is a generally wall-like element tapered inwardly from said sole member as said generally wall-like element progresses upwardly from said sole member, said generally wall-like element defining a rearwardly disposed opening for facilitating regress and ingress of a horse's foot relative to said horse shoe, said opening facing said second sleeve element and spaced from the location of securement of said second sleeve element to the rear of said sole member.

* * * * *